United States Patent
Tada et al.

(10) Patent No.: US 7,337,320 B2
(45) Date of Patent: Feb. 26, 2008

(54) STREAMING SYSTEM FOR DISTRIBUTING ENCRYPTED DATA, AND STREAMING METHOD THEREFOR

(75) Inventors: Keiko Tada, Kanagawa (JP); Ryuji Ishiguro, Tokyo (JP); Motomasa Futagami, Kanagawa (JP)

(73) Assignee: Sony Corporation, Tokyo (JP)

( * ) Notice: Subject to any disclaimer, the term of this patent is extended or adjusted under 35 U.S.C. 154(b) by 716 days.

(21) Appl. No.: 10/473,436

(22) PCT Filed: Jan. 28, 2003

(86) PCT No.: PCT/JP03/00807

§ 371 (c)(1),
(2), (4) Date: Mar. 29, 2004

(87) PCT Pub. No.: WO03/065642

PCT Pub. Date: Aug. 7, 2003

(65) Prior Publication Data

US 2004/0156508 A1    Aug. 12, 2004

(30) Foreign Application Priority Data

Jan. 31, 2002    (JP)    ............................. 2002-024242

(51) Int. Cl.
*G06F 9/00* (2006.01)
(52) U.S. Cl. ..................... 713/171; 713/168; 713/189
(58) Field of Classification Search ............... 713/171, 713/168, 189
See application file for complete search history.

(56) References Cited

FOREIGN PATENT DOCUMENTS

| CA | 2 372 510 | 10/2001 |
|---|---|---|
| CA | 2 379 476 | 12/2001 |
| JP | 2001-352321 | 12/2001 |
| JP | 2002-507868 | 3/2002 |
| WO | WO 99/48296 | 3/1999 |

OTHER PUBLICATIONS

Hallivuori V., Real-time Transport Protocol (RTP) security. In: Proceedings of the Helsinki University of Technology Seminar on Network Security fall 2000 Mobile Security [Online], Oct. 29, 2001.
Menezes, Vanstone, Oorschot: "Handbook of Applied Cryptography" 1997, CRC Press LLC, USA, XP002309850.

*Primary Examiner*—Thomas R. Peeso
(74) *Attorney, Agent, or Firm*—Finnegan, Henderson, Farabow, Garrett & Dunner, L.L.P.

(57) ABSTRACT

The present invention is directed to a streaming system for encrypting encrypted data such as music and image, etc. to perform stream distribution thereof. Client terminals (30) used in this system structure leaves of the hierarchical tree structure, and hold a key set consisting of a route key, node keys and the own leaf key on a path of this tree structure, whereby SDP file is transmitted from a stream server (20). In the SDP file, there is stored encrypted information consisting of EKB including data encrypted by selection key that only specific client terminal holds and encrypted contents key data in which contents key has been encrypted. Only specific client terminal having selection key in key set (selected client terminal) decodes contents key from selection key to decode encrypted contents data caused to undergo stream distribution into contents data to perform real time reproduction thereof.

34 Claims, 9 Drawing Sheets

FIG.3A

```
v=0
o=-3178270499 3178270854 IN IP4 43.xxx.xxx.xxx
s=MPEG4 Video, ATRAC3 Direct
i=Copyright 2001 Shinagawa Corp. -All rights reserved.-
a=x-qt-nam:MPEG4 Video, ATRAC3 Direct
a=x-qt-text-cpy:Copyright 2001 Shinagawa Corp. -All rights reserved.-
a=x-qt-text-cmt:jejex@sm.shinagawa.co.jp
c=IN IP4 43.xxx.xxx.xxx
t=3178270884 0
m=audio 26974 RTP/AVP 98
a=rtpmap:98 X-ATRAC3-105/44100
m=video 26940 RTP/AVP 96
a=rtpmap:96 MP4V-ES/90000
k=
```

FIG.3B

16 k=af9ef28b0000090300000000031bbb25e63acd2ac06687502ba102969b8c6188da91ec2
6000000c000000100000000000092a424514a929e240000000071cc7910145f78a0d4f80e
0bda725c95

FIG.5A

| VERSION (Version):t | |
|---|---|
| INDEX | ENCRYPTION KEY |
| 0 | Enc(K(t)0,K(t)R) |
| 00 | Enc(K(t)00,K(t)0) |
| 000 | Enc(K000,K(t)00) |
| 001 | Enc(K(t)001,K(t)00) |
| 0010 | Enc(K0010,K(t)001) |

FIG.5B

| VERSION (Version):t | |
|---|---|
| INDEX | ENCRYPTION KEY |
| 000 | Enc(K000,K(t)00) |
| 001 | Enc(K(t)001,K(t)00) |
| 0010 | Enc(K0010,K(t)001) |

STREAMING SYSTEM FOR DISTRIBUTING ENCRYPTED DATA, AND STREAMING METHOD THEREFOR

TECHNICAL FIELD

The present invention relates to a streaming system and a streaming method, a client terminal and a contents data decoding method, a stream server and a stream distribution (delivery) method, an authoring apparatus and an authoring method, and a program and a recording medium which are used for performing stream distribution of encrypted data such as music and image, etc. to carry out reproduction in safety on the real time basis.

This Application claims priority of Japanese Patent application No. 2002-024242, field on Jan. 31, 2002, the entirety of which is incorporated by reference herein.

BACKGROUND ART

At present, in transmission of video data on the Internet, there are down-load type transmission system and stream type transmission system (hereinafter referred to as Streaming). In the down-load type transmission system, video file transmitted from distribution server is once (temporarily) copied at the client terminal (device) side, and data (video data) of video file is then reproduced. For this reason, in this down-load type transmission system, it is impossible to carry out reproduction of data at the terminal side until transfer of file is completed. Therefore, this down-load type transmission system is unsuitable for reproducing video data, etc. for long time.

On the other hand, the streaming is such that the client terminal sequentially reproduces successive flow of digital signals on the real time basis while receiving it. Also for a time period during which transmission from stream server to client terminal is carried out, reproduction of received data is performed at the client terminal side. As this streaming system, streaming using protocol RTP (Real-Time Transport Protocol) prescribed in RFC 1889 of IFTF (Internet Engineering Task Force) is the main current.

Ordinarily, the streaming system is composed of an authoring unit, a stream server, and client terminals. The authoring unit is supplied with encrypted contents data obtained by compression-encoding music or video data (hereinafter referred to as contents data) inputted from image input means, etc., e.g., camera or VTR (Video Tape Recorder), etc. and encrypting such contents data by the so-called contents key at encryption unit to prepare, from this encrypted contents data, data for distribution of stream in a form that the distribution (delivery) system determines.

The stream distribution data is such that, e.g., header information for adding header which describes information according to the entirety of contents data, header information for adding track every kind of data, etc. to contents data, and additional information including Session Description Protocol (SDP) file prepared in accordance with Session Description Protocol (SDP) (RFC 237) and packeting control information, etc. are added to encrypted contents data. The stream distribution data prepared in this way is recorded with respect to, e.g., recording unit, etc. of recording medium, etc. such as optical disc, etc. that the authoring unit has. Further, when a request for use of contents is given from the client terminal, this stream distribution data is suitably taken out from the recording unit, and is delivered to the stream server. Thus, Session Description Protocol (SDP) file is transmitted from the stream server to the client terminals.

The client terminal acquires information such as address, port No. and packet form for reception of stream from Session Description Protocol (SDP) file. Then, the stream server packets stream distribution data on the basis of packeting control information to distribute data (stream) to client terminals, e.g., PC (Personal Computer), etc. every packet in accordance with RTP and RTSP (Real-Time Streaming Protocol) to allow the client terminals to perform real time reproduction.

In the conventional streaming method, in packeting encrypted stream data (encrypted contents data) from the stream server to distribute it to the client terminals, Contents Key for decoding this encrypted packet data is required for the client terminal. Namely, before streaming, the client terminal is required to share Contents Key for decoding encrypted contents data caused to undergo stream distribution into contents data with encryption unit in which encrypted contents data is prepared. However, when information of Contents Key is written into Session Description Protocol (SDP) file, since Session Description Protocol (SDP) file is not ordinarily encrypted, there is the problem that information of Contents Key appears so that safety lacks.

DISCLOSURE OF THE INVENTION

An object of the present invention is to provide a streaming system and a streaming method therefor which can solve problems of conventionally proposed data transmission methods as described above.

Another object of the present invention is to provide a streaming system and a streaming method, a client terminal and a contents data decoding method, a stream server and a stream distribution (delivery) method, an authoring apparatus and an authoring method, and a program and a recording medium which are capable of carrying out reproduction on the real time basis in safety in encrypting encrypted data such as music and image, etc. to carry out stream distribution.

A streaming system according to the present invention includes client terminals for decoding encrypted contents data in which contents data has been encrypted by contents key, and a stream server for distributing the encrypted contents data and decoding information for decoding the encrypted contents data to the client terminals, wherein the decoding information includes encrypted contents key data in which contents key has been encrypted.

In the streaming system according to the present invention, since contents key for decoding encrypted contents data is encrypted, only the client terminal which decode this encrypted contents data can decode encrypted contents data.

Before the stream server performs stream distribution of encrypted contents data, decoding information can be stored into session Description Protocol (SDP) file transmitted to the client terminals. Thus, encrypted contents key data can be transmitted to client terminals by using protocol ordinarily used in streaming, i.e., without extending protocol.

A client terminal according to the present invention is structured as leaf of a hierarchical tree structure, which holds a key set consisting of a specific leaf key, node keys and a route key on a path to the route in a key tree consisting of the route key, node keys and leaf keys which are specific to the route, nodes and leaves of the hierarchical tree structure, encrypted decoding key data in which decode key for decoding encrypted contents data is encrypted being stored into an Effective Key Block (EKB). The Effective Key Block (EKB) includes data portion for storing encrypted decode key data encrypted by a selection key which is either one of key sets of one or more selection client terminals selected from client terminals, and tag portion for identifying the position of the encrypted decode key data in the hierarchical tree structure, the client terminal including a first decode means for decoding decode key by the selection key on the basis of information of the tag portion from the encrypted decode key data when the selection key coincides with either one of key sets specific to the client terminals, a second decode means for decoding the contents key from the encrypted contents key data which is encrypted by the decode key, and a third decode means for decoding the contents data from the encrypted contents data which is encrypted by the contents key.

In the client terminal according to the present invention, Effective Key Block (EKB) having encrypted decode key encrypted by selection key that selected client terminal has and encrypted decode key encrypted by decode key are transmitted to respective client terminals, whereby only selected client terminal including selection key in key set can decode encrypted contents data. As a result, reproduction of contents data cannot be performed at the client terminals which do not hold the selection key. Thus, safety in distribution is high.

A client terminal according to the present invention includes receiving means for receiving, from a stream server, decoding information for decoding encrypted contents data in which contents data has been encrypted by contents key, receiving means for performing stream reception of encrypted contents data which has been caused to undergo stream distribution from the stream server, and decode means for performing decode processing, wherein decoding information includes encrypted contents key data in which contents key for decoding encrypted contents data has been encrypted.

A stream server according to the present invention includes transmitting means for transmitting decoding information to client terminals, and distribution means for performing, to the client terminals, stream distribution of encrypted contents data in which contents data has been encrypted by contents key, wherein the decoding information includes encrypted contents key data in which contents key for decoding encrypted contents data into the contents data has been encrypted.

The transmitting means supplied with streaming distribution data prepared by adding, to encrypted contents data, additional information including decoding information consisting of Effective Key Block (EKB) in which decode key for decoding encrypted contents key data has been encrypted is stored and Session Description Protocol (SDP) file in which the encrypted contents key data has been stored and serving to transmit decoding information may be means for transmitting Session Description Protocol (SDP) file including the decoding information, or transmitting means including data supplement means supplied with streaming distribution data prepared by adding additional information including Session Description Protocol (SDP) file to encrypted contents data to supplement decoding information to the Session Description Protocol (SDP) file and serving to transmit decoding information may be means for transmitting Session Description Protocol (SDP) file in which decoding information has been supplemented by data supplement means.

An authoring apparatus according to the present invention includes file preparation means for preparing stream distribution data used in adding decoding information for decoding encrypted contents data in which contents data has been encrypted by contents key to the encrypted contents data so that a stream server performs stream distribution, wherein the decoding information includes encrypted contents key data in which contents key has been encrypted.

Still more further objects of the present invention and practical merits obtained by the present invention will become more apparent from the description of the embodiments which will be given below with reference to the attached drawings.

BRIEF DESCRIPTION OF THE DRAWINGS

FIG. 3A is a view showing an example of Session Description Protocol (SDP) file used in the present invention, and FIG. 3B is a view showing decoding information included in FIG. 3A.

FIGS. 5A and 5B are views showing an example of Effective Key Block (EKB).

BEST MODE FOR CARRYING OUT THE INVENTION

Embodiments of the present invention will now be described in detail with reference to the attached drawings.

Figure 1:
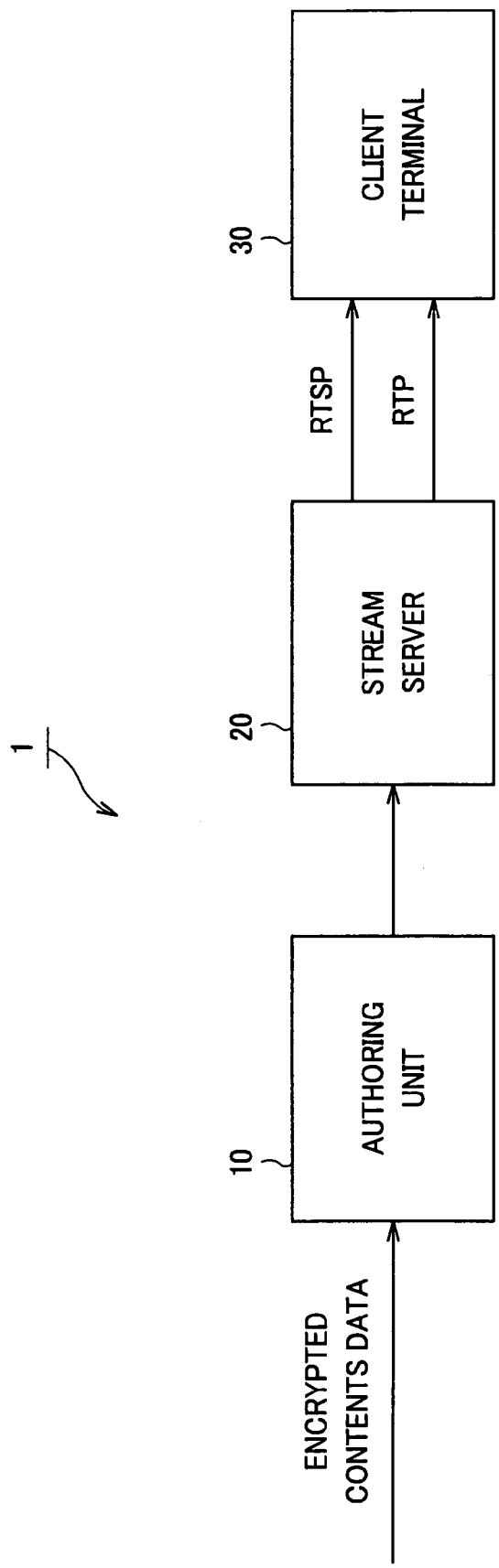
FIG. 1 is a block diagram showing a streaming system according to the present invention.

A streaming system according to the present invention has a configuration as shown in FIG. 1. This streaming system carries out streaming from stream server to client terminals on the Internet.

The streaming system 1 according to the present invention is composed, as shown in FIG. 1, of an authoring unit 10, a stream server 20, and plural client terminals (devices) 30. It is to be noted that, in the example shown in FIG. 1, only one client terminal 30 is indicated. As such streaming system, there is, e.g., QuickTime (Registered Trademark) by Apple corporation.

In FIG. 1, music or video data (hereinafter referred to as contents data) is compression-encoded and encrypted contents data encrypted by the so-called contents key is inputted from image input means, etc., e.g., camera or VTR (Video Tape Recorder), etc. (not shown) to the authoring unit 10. At the authoring unit 10, header information for adding header which describes information according to the entirety of contents data and track every kind of data, etc., to contents data and additional information including Session Description Protocol (SDP) file prepared in accordance with Session Description Protocol (SDP) and packeting control information, etc. serving as control information for packeting are added so that stream distribution (delivery) data in the form that the streaming system 1 determines is prepared.

Figure 2:
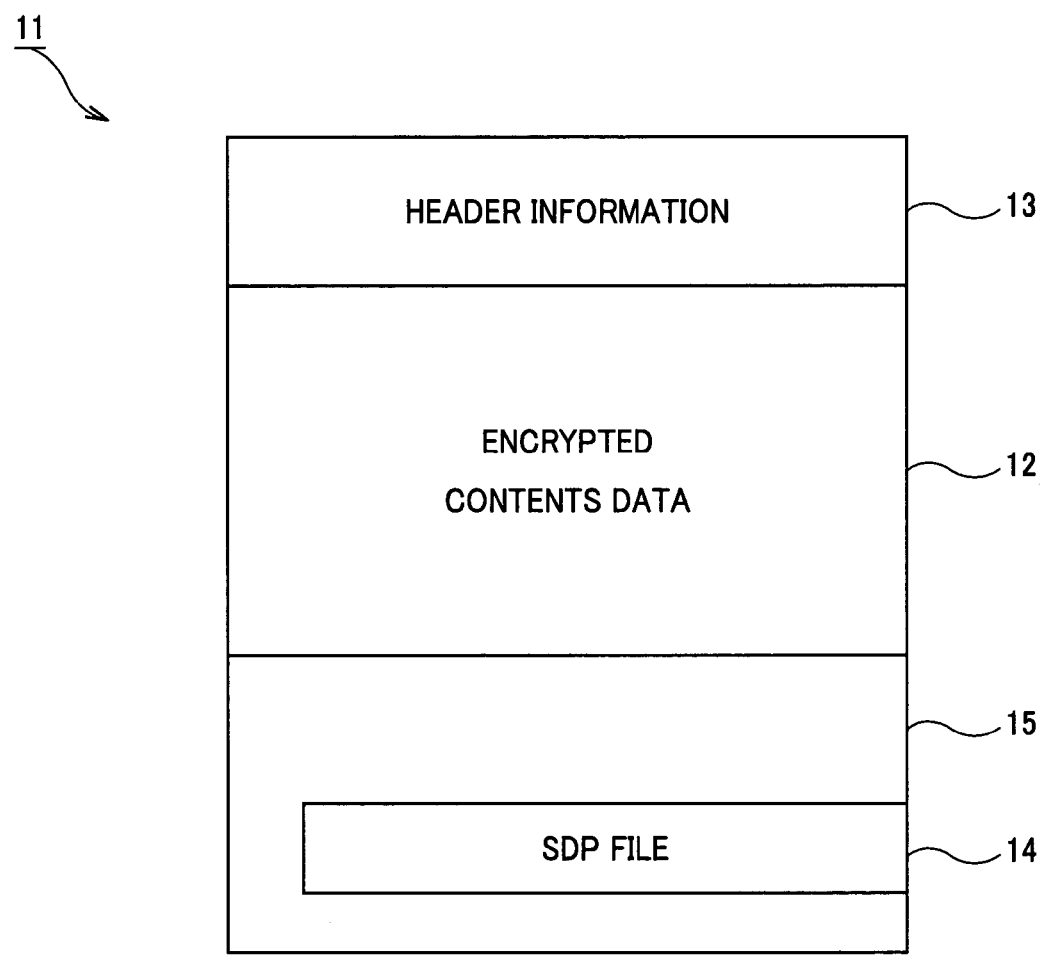
FIG. 2 is a model view showing stream distribution data used in the present invention.

Namely, as shown in FIG. 2, stream distribution data 11 consists of encrypted contents data 12 serving as contents data which has been encrypted, header information 13, and additional information 15 including Session Description Protocol (SDP) 14 and packeting control information, etc. It is to be noted that, in the above-described Quick Time (Registered Trademark), stream distribution data in the QuickTime file form in which packeting information of Hinted Track is added is prepared.

The Session Description Protocol (SDP) file 14 has parameter required when the client terminal 30 performs stream reception and encrypted information required when the client terminal 30 decodes encrypted contents data. An example of SDP file described in the text form is shown in FIG. 3A. As shown in FIG. 3A, in the SDP file, there are described option information such as "i" (session information) and "c" (connection information), etc. as occasion demands along with essential information such as "v" (version of protocol) and "o" (owner or preparer and session identifier), etc.

Here, in the Session Description Protocol (SDP), "k" which is option information is tag indicating encryption key. However, in this embodiment, decoding information consisting of Effective Key Block (EKB) and encrypted contents key data which will be described later are assumed to be described in this "k". For example, in the case of "k" shown in FIG. 3B, e.g., the portion (af9ef28) encompassed by single dotted lines 16 in the figure is encrypted contents key data, and the portion except for the portion encompassed by single dotted lines 16 is file content of Effective Key Block (EKB) which will be described below. In the Effective Key Block (EKB), there is stored encrypted decode key data, which has been encrypted, that only specific client terminal can decode. Thus, only the specific client terminal performs decode processing to have ability to carry out decoding by decode key. The encrypted contents key data is contents key encrypted by this decode key, and encrypted contents data is decoded by contents key which has decoded encrypted contents data to obtain contents data.

For example, in the case where encrypted contents data consists of Video data and Audio data, and the video data and the audio data are encrypted by different contents keys, decoding information ("k") consisting of Effective Key Block (EKB) and encrypted contents key data may be also separately provided in the video field and the audio field. Stream distribution data prepared in the state where such session Description Protocol (SDP) file including term of "k", etc. is added is recorded with respect to recording unit (not shown) that the authoring unit 10 has.

When request for use of contents data is given from the client terminal 30 to the stream server 20, stream distribution data is suitably taken out from the recording unit, and is delivered to the stream server 20. The stream server 20 transmits, to the client terminal 30, Session Description Protocol (SDP) file from the delivered stream distribution data. Thus, at the client terminal 30, decode processing which will be described later is carried out. As a result, request for reproduction of contents data is delivered from a specific client terminal which could decode contents key to the stream server 20. Thus, the stream server 20 packets encrypted contents data of stream distribution data on the basis of the packeting control information to perform, every packet, along with header information, stream distribution to a specific client terminal which has carried out reproduction request.

As described above, in QuikTime (Registered Trademark), packeting information for packeting encrypted contents data, etc. is stored within Hinted Track along with Session Description Protocol (SDP) file. As a stream distribution system of QuickTime, RTSP is used for stream control such as distribution start (reproduction), temporary stop and fast feed of contents, etc. This RTSP is contents transmission control protocol on the Internet, and transmission itself, i.e., streaming is carried out in accordance with RTP. In QuickTime (Registered Trademark), QuickTime Streaming Server is used as stream server, and QuickTime is used as client terminal.

The client terminal 30 are plural different devices, e.g., PC (Personal Computer), etc., and respective client terminals 30 structures leaf of the hierarchical tree structure. Further, the client terminal 30 holds a key set consisting of a leaf key specific thereto, node keys and a route key on the path to the route in the key tree consisting of a route key, node keys and leaf keys which are specific to the route, nodes and leaves of this hierarchical tree structure.

Each client terminal 30 includes receiving means for receiving decoding information, etc. necessary for reception of stream transmitted from the stream server 20, stream receiving means for receiving encrypted contents data caused to undergo stream distribution, and decode processing means for performing decode processing.

In the present invention, decoding information is included in Session Description Protocol (SDP) file. The decoding information consists of Effective Key Block (EKB) which will be described later, and encrypted contents key data in which contents key has been encrypted. In this case, the Effective Key Block (EKB) is block data including data portion including encrypted decode key data in which decode key used for decoding encrypted contents key data has been encrypted by selection key, and tag portion indicating position of the encrypted decode key data in the hierarchical tree structure. The receiving means for receiving information necessary for stream reception acquires parameters (IP address, port No. and packet form, etc.) necessary for stream reception from the Session Description Protocol (SDP) file.

The decode processing means for carrying out decode processing is composed of first to third decode means. When either one of keys included in key set coincides with the selection key at the first decode means, this selection key is used to decode encrypted decode key data included within Effective Key Block (EKB) to obtain decode key. This decode key is used to decode encrypted contents key data at the second decode means to obtain contents key. This contents key is used to decode encrypted contents data that stream receiving means has received at the third decode means to decode the encrypted contents data to perform real time reproduction thereof.

Figure 4:
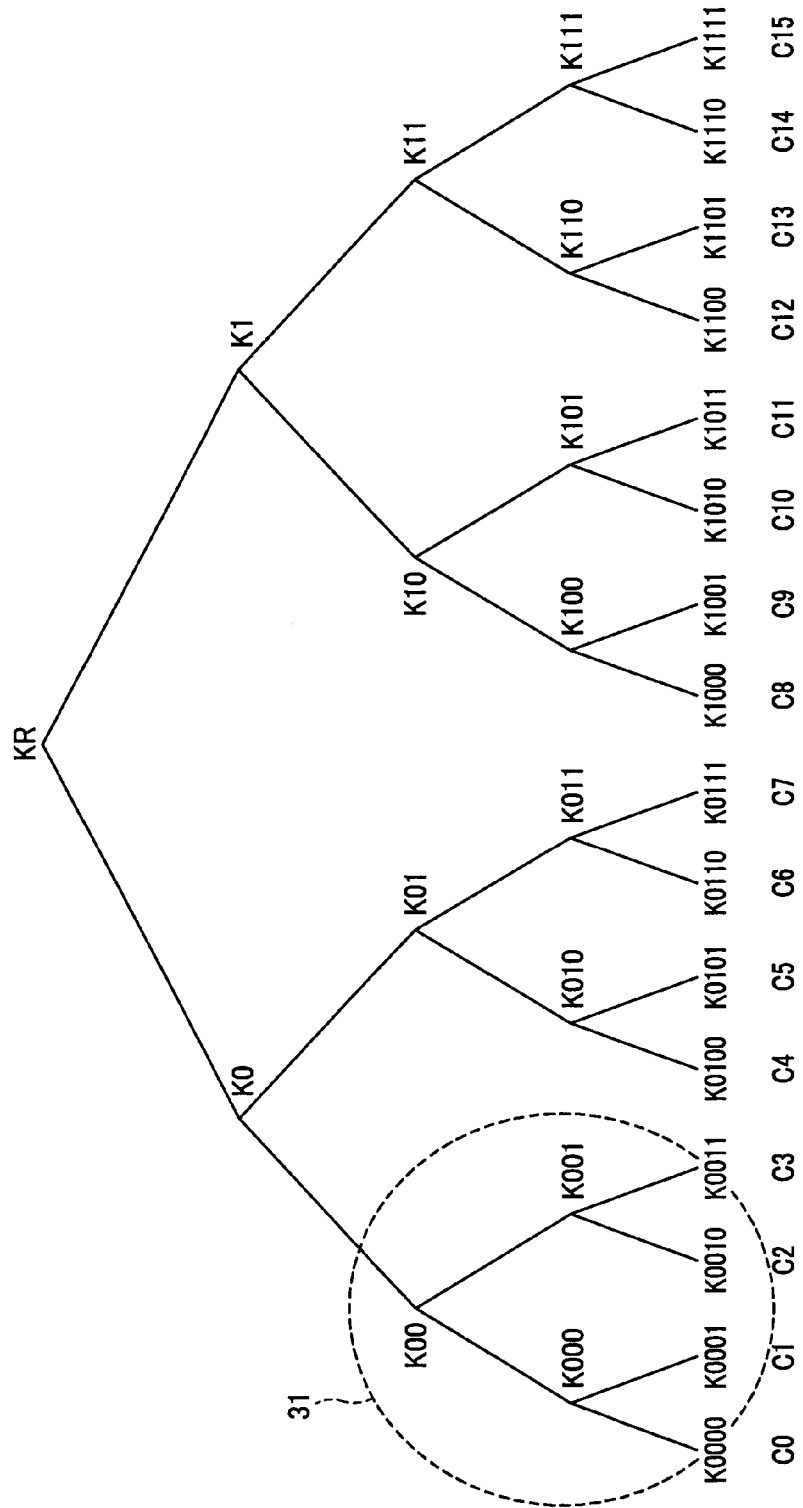
FIG. 4 is a model view showing hierarchical tree structure that client terminal according to the present invention has.

Then, explanation will be given in more detail by using FIG. 4 in connection with the hierarchical tree structure. As shown in FIG. 4, respective client terminals C0~C15 store, into memory, at the time of manufacturing or at the time of delivery (shipping), or thereafter, each key set consisting of a route key and node keys respectively assigned to the route and nodes, and leaf keys of respective leaves on the path from leaf of the client terminal itself to the route. K0000~K1111 indicated at the lowest row of FIG. 4 are leaf keys respectively assigned to respective client terminals C0~C15, and keys: K0~K111 described at the second node from KR (route key) of the uppermost row are assumed to be node key.

In the hierarchical tree configuration shown in FIG. 4, e.g., the client terminal C0 possesses leaf key K0000, and node keys: K000, K00, K0, KR (route key). The client terminal C5 possesses K0101, K010, K01, K0, KR. The client terminal C15 possesses K1111, K111, K11, K1 and KR. It is to be noted that while only 16 client terminals C0~C15 are described in the tree of FIG. 4, and the tree structure is indicated as balanced bilateral symmetric configuration of the four stage configuration, a larger number of client terminals may be structured within tree, and there may be employed a configuration different number of stages at respective portions of the tree.

In respective client terminals included in the tree structure of FIG. 4, there may be included various devices using, e.g., device of the embedded type embedded at the client terminal, and devices using DVD, CD, MD or flash memory, etc. which are detachably constructed with respect to the client terminal.

In these various client terminals, e.g., portion 31 encompassed by dotted lines of FIG. 4, i.e., client terminals C0, C1, C2, C3 are set as one group using the same recording medium. For example, with respect to client terminals C0, C1, C2, C3 included within the group (portion 31) encompassed by the dotted lines, common encrypted contents data may be collectively forwarded from the stream server 20, or Session Description Protocol (SDP) file used commonly to respective client terminals may be forwarded, etc. In the case where data are collectively transmitted, the stream server 20 executes processing to collectively forward data with the portion 31 encompassed by dotted lines of FIG. 4 being as one group. There exist plural groups as described above within the tree of FIG. 4.

It is to be noted that node key and leaf key may be caused to undergo management in generalized manner by a certain one key management (control) center, or there may be employed a configuration in which management is carried out every group by provider such as stream server, etc. for performing various data transmission/reception with respect to respective groups or message data distribution means such as accounts service, etc. At there node keys and leaf keys, e.g., in the case of leakage of key, etc., updating processing is executed. The key management center, the provider or the accounts service, etc. executes this updating processing.

In this tree structure, as apparent from FIG. 4, four client terminals C0, C1, C2, C3 included within one group hold common keys K00, K0, KR as node key. By utilizing this node key common (shared) configuration, if encrypted decode key data is distributed to client terminals C0, C1, C2, C3 as data encrypted by node key K00, only the client terminals C0, C1, C2, C3 decode decode key by using common node key K00 to decode encrypted contents key data by this decode key to have ability to obtain contents key: Kcon. Namely, client terminals C0, C1, C2, C3 are caused to be selected selection client terminal among plural different client terminals C0~C15, and route key K00 is caused to be selection key that this selection client terminal has. It is to be noted that Enc (Ka, Kb) indicates data obtained by encrypting Kb by Ka.

In the case where it is detected that keys: K0011, K001, K00, K0, KR that the client terminal C3 has are analysed by Hacker and revealed, it is necessary to cut off the client terminal C3 from the system in order to defend or protect encrypted contents data (stream data) caused to undergo transmission/reception in the system (group of client terminals C0, C1, C2, C3) at times subsequent thereto. In order to realize this, it is necessary to respectively update node keys: K001, K00, K0, KR into new keys K(t)001, K(t)00, K(t)0, K(t)R to transmit those updating keys to the client terminals C0, C1, C2. Here, K(t)aaa indicates updating key of Generation: t of key Kaaa. This updating key can be used as decode key.

Then, updating of key of Effective Key Block (EKB) will be explained. The Effective Key Block (EKB) is delivered to client terminals, thereby making it possible to distribute updating keys. Updating of key is executed by delivering table constituted by, e.g., Effective Key Block (EKB) shown in FIG. 5A to client terminals.

The Effective Key Block (EKB) shown in FIG. 5A is constituted as block data that only client terminal for which updating of node key is required has updatable data configuration. The example of FIGS. 5A and 5B is directed to block data formed for the purpose of distributing updating node keys of generation t at client terminals C0, C1, C2 within the tree structure shown in FIG. 4. As is clear from FIG. 4, client terminals C0, C1 requires K(t)00, K(t)0, K(t)R as updating node key, and client terminal C2 requires K(t)001, K(t)00, K(t)0, K(t) R as updating node key.

As shown in FIG. 5A, plural encrypted key data are included in Effective Key Block (EKB). The encrypted key data of the lowermost row is Enc (K0010, K(t)001). This is updating node key K(t)001 encrypted by leaf key K0010 specific to client terminal C2, and the client terminal C2 can decode this encrypted key data by leaf key that the client terminal C2 itself has to obtain K(t)001. Moreover, K(t)001 obtained by decoding is used to have ability to decode encrypted key data Enc(K(t)001, K(t)00) positioned at the second row from the bottom portion of FIG. 5A. Thus, it is possible to obtain updating node key K(t)00. At times subsequent thereto, sequentially, encrypted key data Enc (K(t)00, K(t)0) positioned at the second row from the upper portion of FIG. 5A are decoded to decode updating node key K(t)0 and encrypted key data Enc (K(t))0, K(t)R) positioned at the first row from the upper portion of FIG. 5A to obtain updating node key (updating route key) K(t)R.

On the other hand, at client terminals C0, C1, leaf keys K0000, K0001 that the client terminals C0, C1 themselves and node key K000 have are not included in key to be updated. Keys required as updating node key are K(t)00, K(t)0, K(1)R. The client terminals C0, C1 decode encrypted key data Enc (K000, K(t)00) positioned at the third row from the upper portion of FIG. 5A to acquire K(t)00. At times subsequent thereto, the client terminals C0, C1 decode encrypted key data Enc (K(t)00, K(t)0) positioned at the second row from the upper portion of FIG. 5A to decode updating node key K(t)0 and encrypted key data Enc (K(t)0, K(t)R) positioned at the first row from the upper portion of FIG. 5A to obtain updating node key (updating route key) K(t)R. In this way, the client terminals C0, C1, C2 can obtain the updated key K(t)R.

It is to be noted that index of FIG. 5A indicates absolute address of node key or leaf key used as a key for decoding each encrypted key data Enc. In this case, updating node key K(t)R, K(t)0 or K(t)00 may be decode key for decoding encrypted contents data.

Moreover, in the case where updating of node keys: K(t)0, K(t)R of the upper row of the tree structure shown in FIG. 4 is unnecessary, and updating processing of only node key K00 is required, Effective Key Block (EKB) of FIG. 5B is used, thereby making it possible to distribute updating node key K(t)00 to client terminals C0, C1, C2. In this case, updating node key K(t)00 may be decode key for decoding encrypted contents key data.

By distribution of such Effective Key Block (EKB), encrypted contents key data cannot be decoded in equipments of other groups such as client terminal C4, etc. Accordingly, encrypted contents data can be distributed to client terminals except for client terminals C0, C1, C2 as data which is not decoded.

Figure 6:
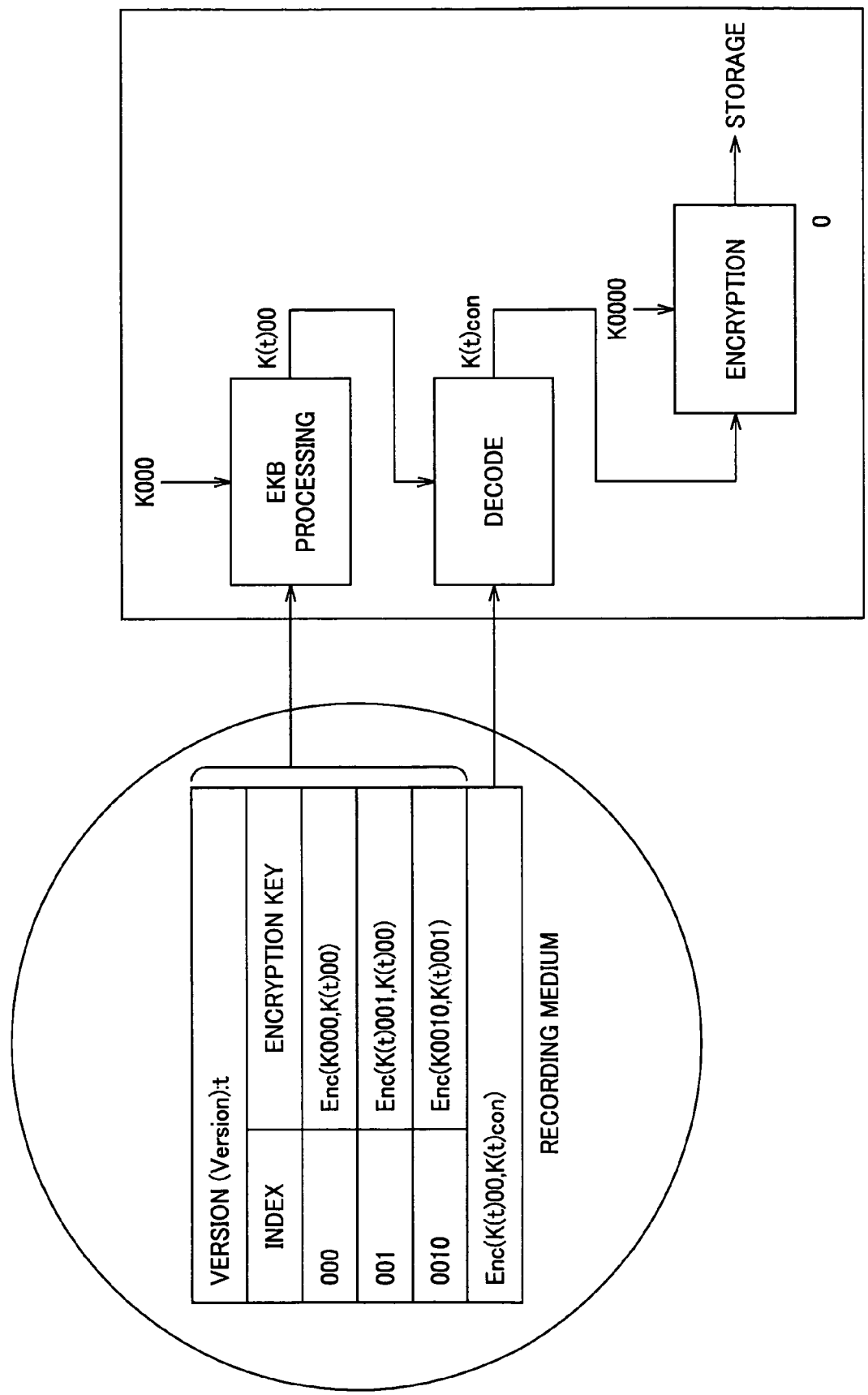
FIG. 6 is a model view showing a distribution example and processing example thereof of decoding information in the streaming system according to the present invention.

Then, processing of client terminal C0 which has received encrypted contents key data Enc (K(t)00, K(t)con) obtained by encrypting contents key K(t)con common to client terminals C0, C1, C2 by using decode key K(t)00, and Effective Key Block (EKB) shown in FIG. 5B is shown in FIG. 6 as an example of processing for obtaining contents key K(t) con at time of t.

As shown in FIG. 6, the client terminal C0 generates node key K(t)00 by EKB processing similar to the above-described processing by using generation: Effective Key Block (EKB) at time point t and node key K000 that the client terminal C0 itself stores in advance. Further, decoded updating node key K(t)00 is used to decode updating contents key K(t) con. In the case where this updating contents key K(t)con is used later, updating contents key K(t)con is encrypted by leaf key K0000 that the client terminal C0 itself holds to store encrypted one.

Figure 7:
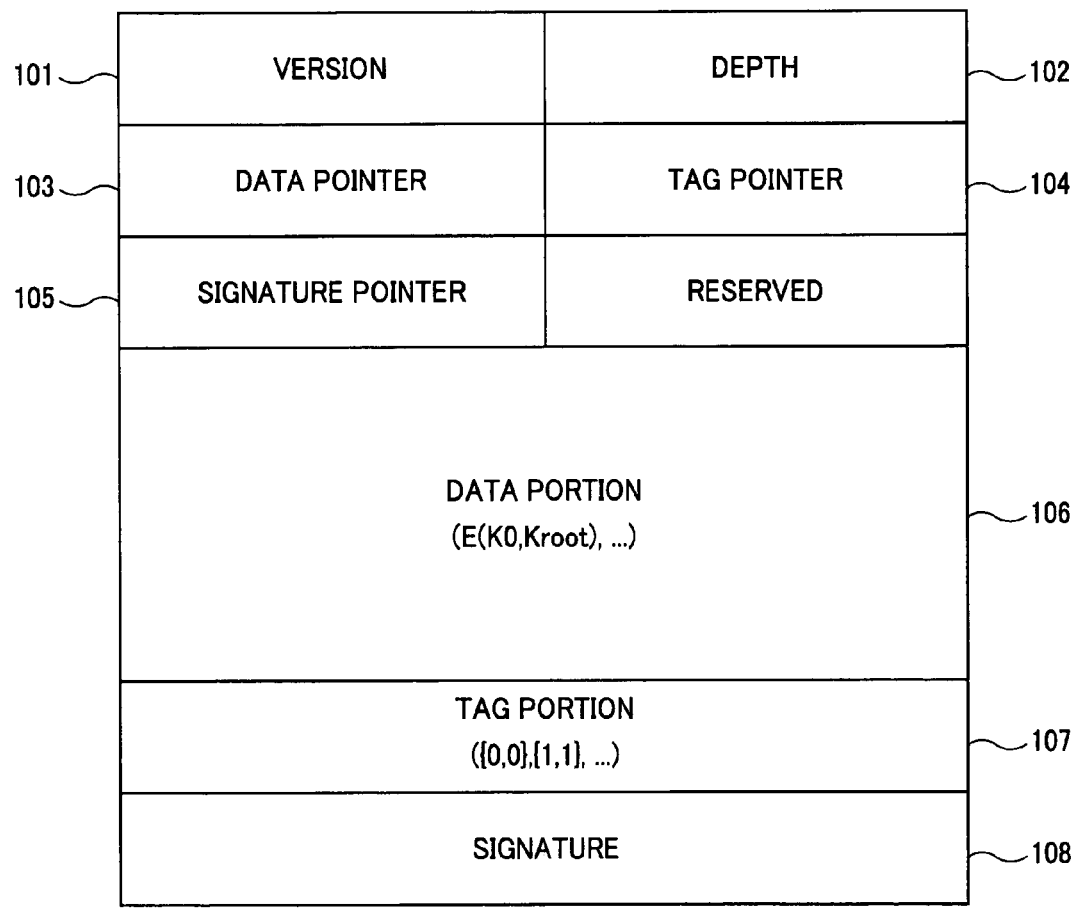
FIG. 7 is a model view showing the configuration of Effective Key Block used in the present invention.

A format example of Effective Key Block (EKB) is shown in FIG. 7. Version 101 is identifier indicating version of Effective Key Block (EKB). It is to be noted that version has function to identify the latest Effective Key Block (EKB) and function indicating correspondence relationship with respect to contents data. Depth 102 indicates the number of hierarchies of the hierarchical tree with respect to client terminals of distribution destination of Effective Key Block (EKB). Data pointer 103 is pointer indicating position of data portion of Effective Key Block (EKB). Tag pointer 104 is pointer indicating position of tag portion. Signature pointer 105 is pointer indicating position of signature.

In data portion 106, e.g., data in which node key to be updated is encrypted is stored. For example, respective encrypted key data, etc. relating to updated node key as shown in FIG. 6 are stored. As described above, updating node key may be used as decode key for decoding encrypted contents key data.

Figure 8:
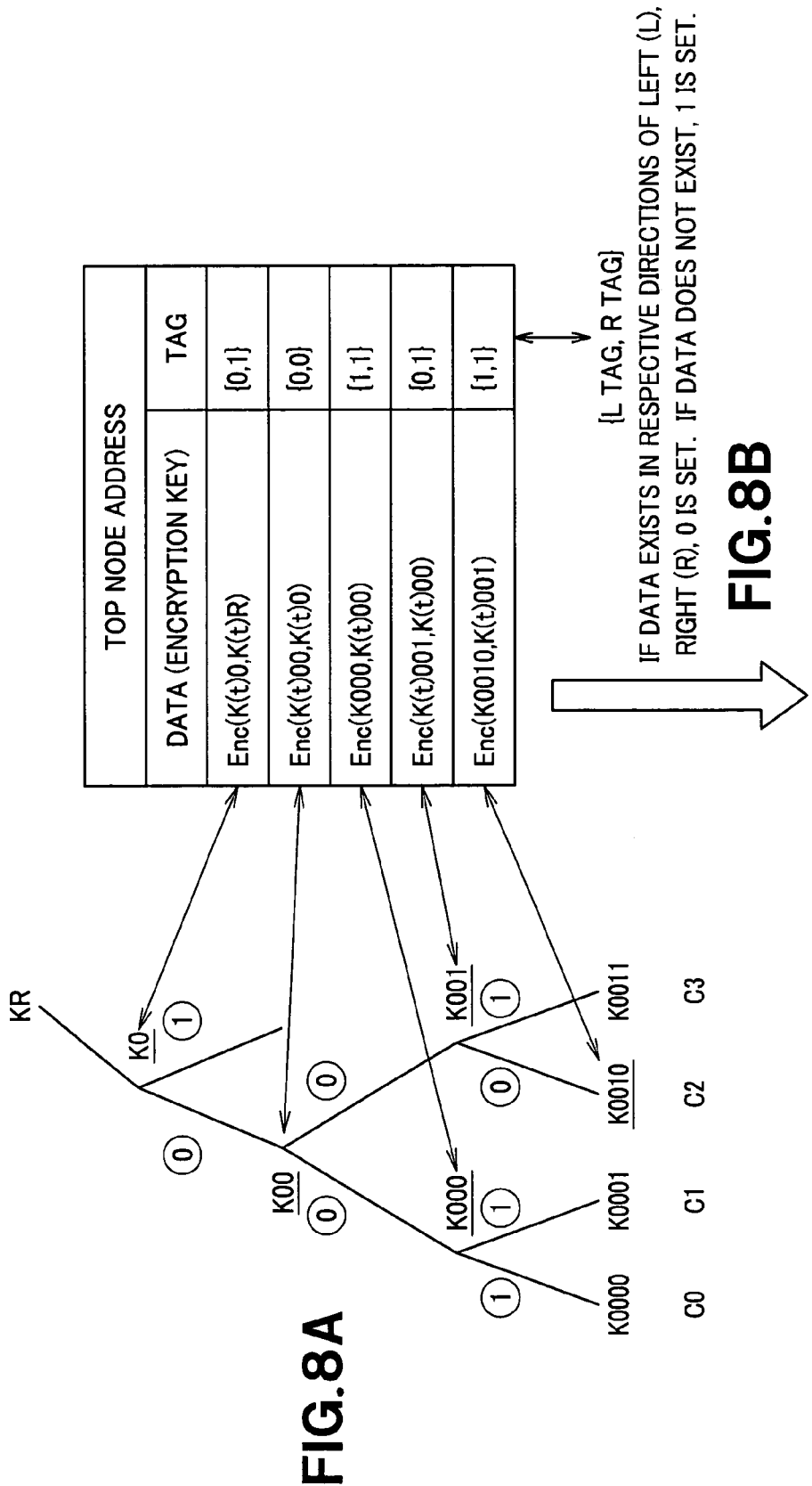
FIGS. 8A to 8C are model views for explaining the configuration of tag portion of Effective Key Block used in the present invention.

Tag portion 107 is tag indicating positional relationship of encrypted node key and leaf key stored in the data portion. The giving rule for this tag will be explained by using FIGS. 8A to 8C. In FIGS. 8A to 8C, the example where Effective Key Block (EKB) previously explained in FIG. 5A is forwarded as data is shown. Encrypted key data in this instance is as shown in FIG. 8B. Address of top node included in encrypted key data at this time is assumed to be top node address. In this case, since updating key K(t)R of route key is included, top node address is caused to be KR. At this time, e.g., data Enc (K(t)0, K(t)R) of the uppermost row is located at the position indicated in the hierarchical tree shown in FIG. 8A. Here, the next data is Enc(K(t)00, K(t)0), and is located at the left lower position of previous data on the tree. In the case where data exists, tag: 0 is set. In the case where data does not exist, tag: 1 is set. Tag is set as {left (L)tag, right (R)tag}. Since data exists at the left of Enc (K(t)0, K(t)R) of the uppermost row, Ltag becomes equal to 0. Since data does not exist at the right thereof, R tag becomes equal to 1. At times subsequent thereto, tags are set to all data. Thus, data train and tag train shown in FIG. 8C are constituted.

Tag is set for the purpose of indicating position of the tree structure where data Enc (Kxxx, Kyyy) is located. Since encrypted key data Enc (Kxxx, Kyyy) . . . to be stored into data portion is nothing but simply encrypted train data of key, position on the tree of encrypted key data stored as data can be discriminated by the above-described tag. Without using the above-described tag, node index caused to be in correspondence with encrypted key data as in the configuration previously explained in FIGS. 5A and 5B may be used to employ, e.g., data configuration 0: Enc (K(t)0, K(t) root)
00: Enc (K(t)00, K(t)0)
000: Enc(K((t)000, K(t)00))
. . .

However, when there is employed such configuration using index, there results redundant data. As a result, data quantity is increased. This is not preferable in distribution through network. On the contrary, the above-described tag is used as index data indicating key position, whereby key position can be discriminated by less data quantity.

Returning to FIG. 7, EKB format will be explained in more detail. Signature is electronic signature that, e.g., key management center, contents provider or accounts service, etc. which has issued Effective Key Block (EKB) executes. The client terminal which has received Effective Key Block (EKB) confirms by signature verification that current Effective Key Block (EKB) is Effective Key Block (EKB) that proper Effective Key Block (EKB) issuer has issued.

The client terminals receive, along with Session Description Protocol (SDP), such Effective Key Block (EKB) and encrypted contents key data. Thus, only selected selection client terminal which can carry out processing of Effective Key Block (EKB) decodes contents key.

Then, the operation of the present invention will be explained. First, contents data inputted from moving picture input device such as camera or VTR, etc. and converted into digital signal is compression-encoded by MPEG, etc., and is encrypted. The contents data thus processed is delivered to authoring unit 10 shown in FIG. 1. At the authoring unit 10, Session Description Protocol (SDP) file, etc. is added so that stream distribution data of a predetermined form is prepared. The data thus prepared is recorded and held.

Figure 9:
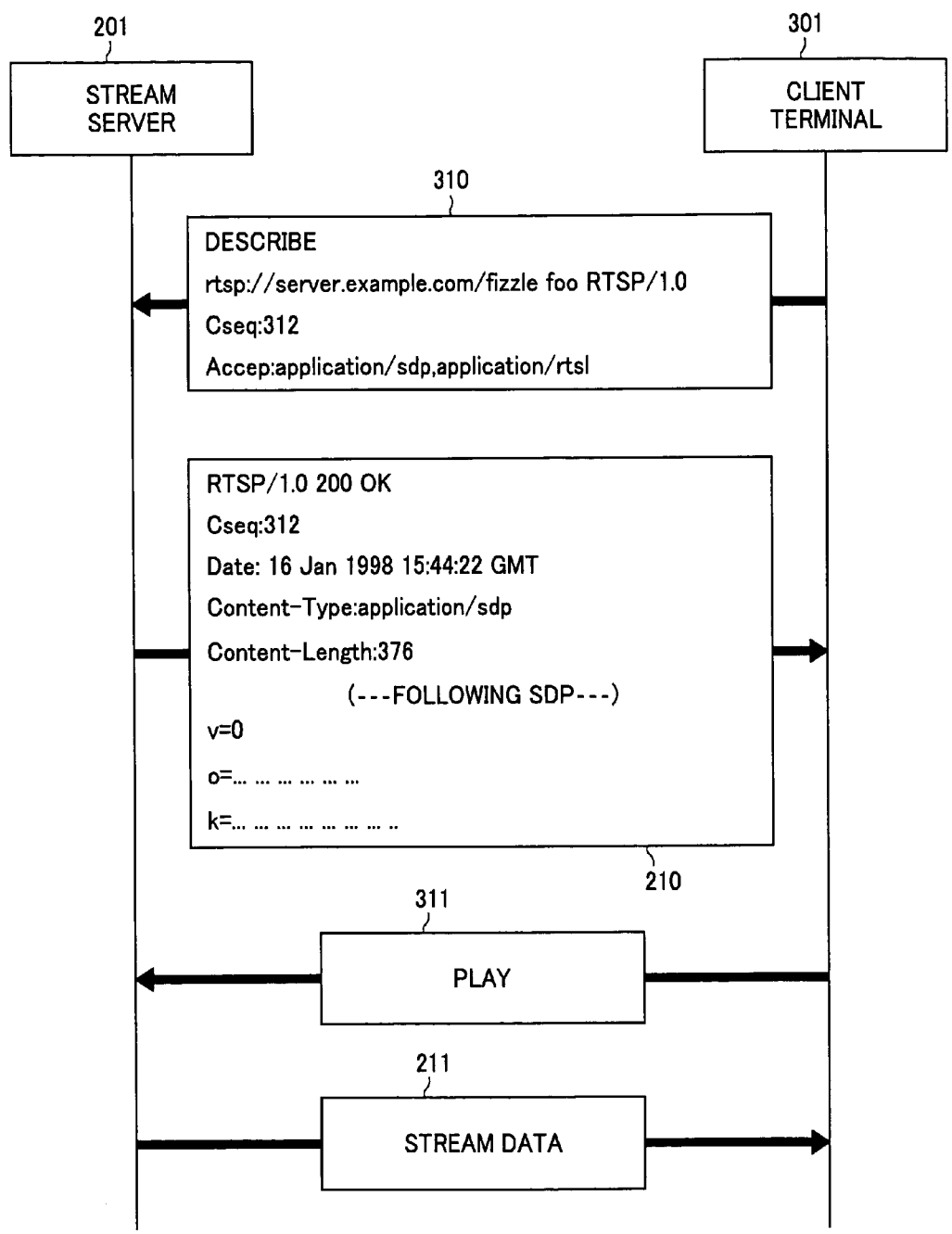
FIG. 9 is a model view showing processing steps of the streaming system according to the present invention.

Then, as shown in FIG. 9, a client terminal 301 delivers request 310 of contents data to a stream server 201 in accordance with use request (DESCRIBE) of contents of RTSP. The stream server 201 delivers Session Description Protocol (SDP) file 210 to the client terminal 301 in accordance with this request. In the Session Description Protocol (SDP) file 210, decoding information consisting of Effective Key Block (EKB) and encrypted contents key data is included as described above. The client terminal 301 acquires parameter necessary for stream reception from Session Description Protocol (SDP) file, and processes Effective Key Block (EKB) within Session Description Protocol (SDP) file. In this instance, since client terminal which does not hold selection key required for processing Effective Key Block (EKB) cannot process Effective Key Block (EKB) as described above, the client terminal does not make a request for stream reception to the stream server 201. It is to be noted that client terminal which cannot process Effective Key Block (EKB) cannot decode encrypted contents data even if it is distributed.

On the other hand, client terminal 301 which could process Effective Key Block (EKB) decodes encrypted contents key data stored along with Effective Key Block (EKB) in Session Description Protocol (SDP) file to obtain contents key, and makes a request for transmitting start (PLAY) 311 of stream data to the stream server 201. In accordance with this request, stream data 211 including encrypted contents data is caused to undergo stream distribution from the stream server 201. Further, the client terminal 301 decodes encrypted contents data which has been caused to undergo stream distribution into contents data by contents key obtained by decoding Effective Key Block (EKB) and encrypted contents data to perform real time reproduction.

Further, e.g., in Quicktime (Registered Trademark), e.g., security information (Security info Atom) is supplemented to Quick Time file form which is stream distribution data form to embed Effective Key Block (EKB) and encrypted contents key data. In this instance, when Effective Key Block (EKB) and encrypted contents key data are described also within Session Description Protocol (SDP), Effective Key Block (EKB) and encrypted contents key data are doubly stored with respect to stream distribution data. In this case, check, etc. of matching as to whether or not both Effective Key Block (EKB) and encrypted contents key data are the same is required. In view of the above, module (additional software) is added or supplemented to stream server to copy Effective Key Block (EKB) within Security info Atom and encrypted contents key data into Session Description Protocol (SDP) to transmit, to the client terminal, Session Description Protocol to which this decoding information has been added. In a manner as stated above, decoding information consisting of Effective Key Block (EKB) and encrypted contents key data may be also added into Session Description Protocol (SDP) file at the stream server in place of the authoring unit.

In accordance with the present invention constituted in this way, decoding information consisting of Effective Key Block (EKB) and encrypted contents key data is only added or supplemented to Session Description Protocol (SDP) file, whereby only specific client terminal which can process Effective Key Block (EKB) can decode contents key from encrypted contents key data. For this reason, it is possible to maintain extremely high safety which is the same degree as that of ordinary disc reproduction.

In the above-described conventional example, since the client terminal acquires contents key in which contents data has been encrypted, it is necessary to use protocol different from protocol used in streaming to transmit contents key from the authoring unit to the client terminal, or to insert contents key information into the encrypted contents data. For this reason, in order to allow encrypted contents data to undergo streaming, it was necessary to carry out extension from conventionally used protocol. On the contrary, in the present invention, since Effective Key Block (EKB) and encrypted contents key can be transmitted in the state where they are stored within the Session Description protocol (SDP) file, decoding information can be transmitted by using the existing protocol. Namely, it is possible to carry out stream reception of encrypted contents data in safety without extending protocol.

For example, in QuickTime, field of "k" consisting of Effective Key Block (EKB) and encrypted contents key data is only added or supplemented into Session Description Protocol (SDP) file of Hinted Track, i.e., the content of Session Description Protocol (SDP) is only changed, thereby making it possible to realize streaming extremely excellent in safety without extending the protocol.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

INDUSTRIAL APPLICABILITY

As described above, the streaming system according to the present invention includes client terminals for decoding encrypted contents data in which contents data has been encrypted by contents key, and stream server for distributing the encrypted contents data and decoding information for decoding the encrypted contents data to the client terminals, wherein the decoding information includes encrypted contents key data in which contents key has been encrypted. Accordingly, contents key for decoding encrypted contents data is transmitted in the state where it is encrypted. For this reason, only the client terminal which can decode encrypted contents key data can decode encrypted contents data. Thus, safety in streaming is high.

Further, in the present invention, the client terminals are structured as leaves of the hierarchical tree structure, each of which holds key set consisting of specific leaf key and node keys and route key on path to the route in key tree consisting of route key, node keys and leaf keys which are specific to the route, nodes and leaves of the hierarchical tree structure, encrypted decode key data in which decode key for decoding encrypted contents key is encrypted being stored into Effective Key Block (EKB), the Effective Key Block (EKB) including data portion for storing encrypted decode key data encrypted by selection key which is either one of key sets of one or more selection client terminals selected from client terminals and tag portion for identifying the position of the encrypted decode key data in the hierarchical tree structure, the client terminal including first decode means for decoding decode key by selection key on the basis of information of the tag portion from the encrypted decode key data when selection key coincides with either one of key sets specific to the client terminals, second decode means for decoding contents key from the encrypted contents key data which is encrypted by decode key, and third decode means for decoding contents data from the encrypted contents data which is encrypted by contents key, thereby making it possible to transmit decoding information of encrypted contents data to client terminals without extending the existing protocol. In addition, only specific client terminal performs decode processing of decoding information to have ability to obtain contents key. Thus, safety in stream distribution is extremely high.

The invention claimed is:

1. A client terminal including:
   receiving means for receiving, from a stream server, decoding information for decoding encrypted contents data, wherein the contents data has been encrypted by a contents key;
   stream receiving means for receiving the encrypted contents data that has undergone stream distribution from the stream server; and
   decode means for performing decode processing using decoding information,
   wherein the decoding information includes encrypted contents key data in which the contents key for decoding the encrypted contents data has been encrypted.

2. The client terminal as set forth in claim 1,
   wherein the decoding information includes encrypted decode key data in which decode key for decoding the encrypted contents key data into the contents key has been encrypted.

3. The client terminal as set forth in claim 2,
   wherein the client terminals are structured as leaves of a hierarchical tree structure, and each of the client terminals holds a key set in a key tree comprising a specific leaf key, node keys and a route key corresponding to leaves, nodes and a route along a path of the hierarchical tree structure, wherein the encrypted decode key data is stored in an Effective Key Block (EKB), wherein the Effective Key Block (EKB) includes data portion in which the encrypted decode key data is encrypted by a selection key which is either one of the route key, the node keys and the leaf keys, and a tag portion for identifying the position of the encrypted decode key data in the hierarchical tree structure, and wherein the decode means comprises a first decode means for decoding the decode key by the selection key on the basis of information from the tag portion that identifies either one of the key sets, a second decode means for decoding the contents key from the encrypted contents key data which is encrypted by the decode key, and a third decode means for decoding the contents data from the encrypted contents data which is encrypted by the contents key.

4. The client terminal as set forth in claim 3, wherein the route and the route key are respectively a root node and a root node key specific to the root node when a single node of the hierarchical tree structure is the root.

5. The client terminal as set forth in claim 3, wherein the decode key is an updated route key or an updated node key in which the route key and/or the node keys of the key set have been updated by decode processing using the Effective Key Block (EKB) by the first decode means.

6. The client terminal as set forth in claim 1, wherein the decoding information is stored within a Session Description Protocol (SDP) file received from the stream server prior to the stream reception.

7. A contents data decoding method including:

receiving, from a stream server, decoding information for decoding encrypted contents data, wherein the contents data has been encrypted by a contents key;

receiving the encrypted contents data that has undergone stream distribution from the stream server; and performing decode processing using decoding information, wherein the decoding information includes encrypted contents key data in which the contents key for decoding the encrypted contents data has been encrypted.

8. The contents data decoding method as set forth in claim 7, wherein the decoding information includes encrypted decode key data in which decode key for decoding the encrypted contents data into the contents key has been encrypted.

9. The contents data decoding method as set forth in claim 8, wherein the encrypted decode key data is stored in an Effective Key Block (EKB), wherein the Effective Key Block (EKB) includes data portion for storing the encrypted decode key data encrypted by a selection key which is either one of a route key, node keys and leaf keys which are respectively specific to the route, nodes and leaves of the hierarchical tree structure, and tag portion for identifying the position of the encrypted decode key data in the hierarchical tree structure, and wherein the decode processing includes:

decoding the decode key by the selection key on the basis of information from the tag portion that identifies either one of key sets each comprising a specific leaf key that a client terminal structured as leaf of the hierarchical tree structure has, node keys and a route key on a path to the route in a key tree comprising the route key, node keys and leaf keys which are specific to the route, nodes and leaves of the hierarchical tree structure, decoding the contents key from the encrypted contents key data which is encrypted by the decode key, and decoding the contents data from the encrypted contents data which is encrypted by the contents key.

10. The contents data decoding method as set forth in claim 7, wherein the decoding information is stored in a Session Description Protocol (SDP) file received from the stream server prior to the stream reception.

11. A data distribution method including:

transmitting decoding information to client terminal terminals; and performing stream distribution of encrypted contents data to the client terminals, wherein the contents data has been encrypted by a contents key, wherein decoding information includes encrypted contents key data in which the contents key for decoding the encrypted contents data into the contents data has been encrypted.

12. The data distribution method as set forth in claim 11, wherein the decoding information includes encrypted decode key data in which decode key for decoding the encrypted contents data into the contents key has been encrypted.

13. The data distribution method as set forth in claim 12, further comprising, receiving streaming distribution data prepared so that additional information is added to the encrypted contents data including an Effective Key Block (EKB) in which the encrypted decode key data has been stored and a Session Description Protocol (SDP) file in which the encrypted contents key data has been stored, wherein the transmitting step of transmitting the decoding information is a step of transmitting the Session Description Protocol (SDP) file prior to the stream distribution, wherein the client terminal holds a key set comprising keys on a path to the route in a key tree comprising a route key, node keys and leaf keys which are specific to the route, nodes and the leaves of a hierarchical tree structure in which a plurality of client terminals are structured as leaves, wherein the Effective Key Block (EKB) includes data portion in which the encrypted decode key data has been stored, and tag portion for identifying the position of the encrypted decode key data in the hierarchical tree structure, and wherein the encrypted decode key data can be decoded into the decode key on the basis of information from the tag portion by either one of keys included in a key set of one or more selection client selected from the plurality of client terminals.

14. The data distribution method as set forth in claim 11, wherein the decoding information is stored within a Session Description Protocol (SDP) transmitted prior to stream distribution of the encrypted contents data.

15. The data distribution method as set forth in claim 12, further comprising:

receiving streaming distribution data prepared so that additional information including a Session Description Protocol (SDP) file is added to the encrypted contents data, and supplementing an Effective Key Block (EKB) in which the encrypted decode key data has been stored wirth the encrypted contents key data, to the Session Description Protocol (SDP) file, wherein the step of transmitting decoding information includes transmitting the Session Description Protocol (SDP) file to which the Effective Key Block (EKB) and the encrypted contents key data have been supplemented prior to the stream distribution, wherein the client terminal holds a key set comprising keys on a path to the route in a key tree comprising a route key, node keys and leaf key which are specific to the route, nodes and leaves of the hierarchical tree structure in which a plurality of client terminals are structured as leaves, wherein the Effective Key Block (EKB) includes a data portion in which the encrypted decode key data has been stored, and a tag portion for identifying the position of the encrypted decode key data in the hierarchical tree structure, and wherein the encrypted decode key data can be decoded into the decode key on the basis of information of the tag portion by either one of keys included in a key set of one or more selection client terminals selected from the plurality of client terminals.

16. A stream server including:

transmitting means for transmitting decoding information to client terminals; and distribution means for performing stream distribution of encrypted contents data to the client terminals, wherein the contents data has been encrypted by a contents key, wherein decoding information includes encrypted contents key data in which the contents key for decoding the encrypted contents data into the contents data has been encrypted.

17. The stream server as set forth in claim 16, wherein the decoding information includes encrypted decode key data in which decode key for decoding the encrypted contents data into the contents key has been encrypted.

18. The stream server as set forth in claim 17, wherein there is delivered streaming distribution data prepared so that additional information is added to the encrypted contents data including an Effective Key Block (EKB) in which the encrypted decode key data has been stored and a Session Description Protocol (SDP) file in which the encrypted contents key data has been stored, wherein transmitting means which transmits the decoding information serves to transmit the Session Description Protocol (SDP) file prior to the stream distribution, wherein the client terminal holds a key set comprising keys on a path to the route in a key tree comprising a route key, node keys and leaf keys which are specific to the route, nodes and the leaves of a hierarchical tree structure in which a plurality of client terminals are structured as leaves, wherein the Effective Key Block (EKB) includes data portion in which the encrypted decode key data has been stored, and tag portion for identifying the position of the encrypted decode key data in the hierarchical tree structure, and wherein the encrypted decode key data can be decoded into the decode key on the basis of information from the tag portion by either one of keys included in a key set of one or more selection client terminals selected from the plurality of client terminals.

19. The stream server as set forth in claim 18, wherein the route and the route key are respectively a root node and a root node key specific to the summit node when a single node of the hierarchical tree structure is the root.

20. The stream server as set forth in claim 18, wherein the decode key is an updated route key or an updated node key in which the route key and/or the node keys of the key set have been updated by decode processing using the Effective Key Block (EKB) by the first decode means.

21. The stream server as set forth in claim 16, wherein the decoding information is stored in a Session Description Protocol (SDP) file transmitted before the enciphered contents data is caused to undergo stream distribution.

22. The stream server as set forth in claim 17, wherein there is delivered streaming distribution data prepared so that additional information including a Session Description Protocol (SDP) file is added to the encrypted contents data, the stream server including data supplement means for supplementing an Effective Key Block (EKB) within which the encrypted decode key data has been stored with the encrypted contents key data, to the Session Description Protocol (SDP) file, wherein transmitting means which transmits the decoding information serves to transmit the Session Description Protocol (SDP) file to which the Effective Key Block (EKB) and the encrypted contents data have been supplemented by the data supplement means prior to the stream distribution, wherein the client terminal holds a key set comprising keys on a path to the route in a key tree comprising a route key, node keys and leaf keys which are respectively specific to the route, nodes and leaves of the hierarchical tree structure in which a plurality of client terminals are structured as leaves, wherein the Effective Key Block (EKB) includes data portion in which the encrypted decode key data has been stored, and tag portion for identifying the position of the encrypted decode key data in the hierarchical tree structure, and wherein the encrypted decode key data can be decoded into the decode key on the basis of information of the tag portion by either one of keys included in a key set of one or more selection client terminal selected from the plurality of client terminals.

23. The stream server as set forth in claim 22, wherein the route and the route key are respectively a root node and a root node key specific to the summit node when a signal node of the hierarchical tree structure is the root.

24. The stream server as set forth in claim 22, wherein the decode key is an updated route key or an updated node key in which the route key and/or the node keys of the key set have been updated by decode processing using the Effective Key Block (EKB) by the first decode means.

25. An authoring apparatus including:

file preparation means for adding decoding information for decoding encrypted contents data to the encrypted contents data to prepare stream distribution data used when a stream server performs stream distribution, wherein the encrypted contents data comprises contents data encrypted by a contents key, wherein the decoding information includes encrypted contents key data in which the contents key has been encrypted.

26. The authoring apparatus as set forth in claim 25, wherein the decoding information includes encrypted decode key data in which a decode key for decoding the encrypted contents data into the contents key has been encrypted.

27. The authoring apparatus as set forth in claim 26, wherein the file preparation means adds additional information including an Effective Key Block (EKB) in which the decoding key data has been stored and a Session Description Protocol (SDP) file in which the encrypted contents key data has been stored to the encrypted contents data to prepare streaming distribution data when the stream server performs stream distribution of contents data utilizable only at one or more selection client terminals selected from a plurality of different client terminals, wherein the client terminal holds a key set comprising keys on a path to the route in a key tree comprising a route key, node keys and leaf keys which are respectively specific to the route, nodes and leaves of a hierarchical tree structure in which the plurality of client terminals are structured as leaves, wherein the Effective Key Block (EKB) includes a data portion which stores the encrypted decode key data in which the decode key for decoding the encrypted contents key data has been encrypted, and a tag portion for identifying the position of the encrypted decode key data in the hierarchical tree structure, and wherein the encrypted decode key data can be decoded into the decode key on the basis of information from the tag portion by either one of the keys included in a key set that the selection client terminal has.

28. The authoring apparatus as set forth in claim 27, wherein the route and the route key are respectively a root node and a root node key specific to the root node when a single node of the hierarchical tree structure is the root.

29. The authoring apparatus as set forth in claim 27, wherein the decode key is an updated route key or an updated node key in which the route key and/or the node keys of the key set have been updated by decode processing using the Effective Key Block (EKB) by the first decode means.

30. The authoring apparatus as set forth in claim 25, wherein the stream distribution data includes a Session Description Protocol (SDP) file, and wherein the decoding information is stored in the Session Description Protocol (SDP) file.

31. An authoring method including:

preparing stream distribution data used when a stream server performs stream distribution, wherein decoding information for decoding encrypted contents data is added to the encrypted contents data, and further wherein the encrypted contents data comprises contents data that has been encrypted by a contents key, and wherein the decoding information includes encrypted contents key data in which the contents key has been encrypted.

32. The authoring method as set forth in claim 31, wherein the decoding information includes encrypted decode key data in which decode key for decoding the encrypted contents key data into the contents key has been encrypted.

33. The authoring method as set forth in claim 32, further comprising adding additional information including an Effective Key Block (EKB) in which decoding key data has been stored and a Session Description Protocol (SOP) file in which the encrypted contents key data has been stored to the encrypted contents data to prepare streaming distribution data used when the stream server performs stream distribution of contents data utilizable at one or more selection client terminals selected from different client terminals, wherein the client terminal holds a key set comprising keys on a path to the route in a key tree comprising a route key, node keys and leaf keys which are respectively specific to the route, nodes and leaves of a hierarchical tree structure in which the client terminals are structured as leaves, wherein the Effective Key Block (EKB) includes a data portion in which the encrypted decode key data has been stored, and a tag portion for identifying the position of the encrypted decode key data in the hierarchical tree structure, and wherein the encrypted decode key data can be decoded into the decode key on the basis of information from the tag portion by either one of the keys included in a key set that the selection client terminal has.

34. The authoring method as set forth in claim 31, wherein the stream distribution data includes a Session Description Protocol (SDP) file, and wherein the decoding information is stored in the Session Description Protocol (SDP) file.

* * * * *